United States Patent
Goto et al.

(10) Patent No.: US 12,522,796 B2
(45) Date of Patent: *Jan. 13, 2026

(54) CULTURING METHOD AND CULTURING DEVICE

(71) Applicant: HONDA MOTOR CO., LTD., Tokyo (JP)

(72) Inventors: Minoru Goto, Wako (JP); Nozomi Shiobara, Wako (JP); Shohei Kinoshita, Wako (JP); Fumitomo Takano, Wako (JP); Mizuho Doi, Wako (JP); Satoshi Shiozaki, Wako (JP); Kenji Machida, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 732 days.

This patent is subject to a terminal disclaimer.

(21) Appl. No.: 17/681,943

(22) Filed: Feb. 28, 2022

(65) Prior Publication Data

US 2022/0312705 A1 Oct. 6, 2022

(30) Foreign Application Priority Data

Mar. 31, 2021 (JP) ................. 2021-061696

(51) Int. Cl.
*C12M 1/34* (2006.01)
*A01G 33/00* (2006.01)
*C12M 1/00* (2006.01)

(52) U.S. Cl.
CPC ............ *C12M 41/12* (2013.01); *A01G 33/00* (2013.01); *C12M 29/06* (2013.01); *C12M 29/18* (2013.01); *C12M 41/26* (2013.01); *C12M 41/32* (2013.01); *C12M 41/34* (2013.01)

(58) Field of Classification Search
None
See application file for complete search history.

(56) References Cited

U.S. PATENT DOCUMENTS

| | | | |
|---|---|---|---|
| 4,084,346 A | 4/1978 | Stengel et al. | |
| 6,509,188 B1 | 1/2003 | Trosch et al. | |
| 2003/0017558 A1 | 1/2003 | Pham et al. | |

FOREIGN PATENT DOCUMENTS

| | | | |
|---|---|---|---|
| CN | 1345369 | 4/2002 | |
| CN | 107586720 | 1/2018 | |
| CN | 109609383 | 4/2019 | |
| JP | 60-019989 | 5/1985 | |
| JP | 06-000079 | 1/1994 | |
| JP | 07-246086 | 9/1995 | |
| JP | 2002-541788 | 12/2002 | |
| JP | 2003-235544 | 8/2003 | |
| JP | 2009-060876 | 3/2009 | |
| JP | 2019-10767 A * | 12/2017 | ............. C12M 1/00 |
| JP | 2019-110767 | 7/2019 | |

OTHER PUBLICATIONS

Japanese Office Action for Japanese Patent Application No. 2021-061696 dated Oct. 29, 2024.
Mizuno, "Applications of Physics and Chemistry to Agricultural Technology", Agriculture and horticulture, 2016, vol. 91, No. 12, pp. 1189-1203 (Date of Publication: Dec. 2016).

* cited by examiner

*Primary Examiner* — Jana A Hines
*Assistant Examiner* — Khatol S Shahnan Shah
(74) *Attorney, Agent, or Firm* — Amin, Turocy & Watson, LLP

(57) ABSTRACT

In a culturing method, microalgae are cultured in a culturing solution while a gas containing carbon dioxide is supplied to the culturing solution. In an ion concentration acquisition step, an acquired value of a concentration of hydrogen carbonate ions in the culturing solution is obtained. In an ion concentration adjustment step, in the case that the acquired value does not reside within a set concentration range that is set beforehand, at least one of a temperature or a pH of the culturing solution is adjusted, whereby the concentration of hydrogen carbonate ions in the culturing solution is adjusted to reside within the set concentration range.

9 Claims, 4 Drawing Sheets

CULTURING METHOD AND CULTURING DEVICE

CROSS-REFERENCE TO RELATED APPLICATIONS

This application is based upon and claims the benefit of priority from Japanese Patent Application No. 2021-061696 filed on Mar. 31, 2021, the contents of which are incorporated herein by reference.

BACKGROUND OF THE INVENTION

Field of the Invention

The present invention relates to a culturing method and a culturing device for culturing microalgae.

Description of the Related Art

Microalgae that are cultured in a culturing solution grow and propagate due to photosynthesis using light energy, carbon dioxide, and water. A portion of the carbon dioxide ($CO_2$) that is dissolved in the culturing solution containing water becomes carbonic acid ($H_2CO_3$). Such carbonic acid is ionized in a stepwise manner into hydrogen carbonate ions (bicarbonate ions, $HCO_3^-$) and carbonic acid ions ($CO_3^{2-}$). A very small amount of the carbonic acid is bundled together with carbon dioxide. In this case, within the culturing solution, an equilibrium state of the carbon dioxide, the hydrogen carbonate ions, and the carbonate ions is established depending on the pH of the culturing solution. The carbon dioxide, the hydrogen carbonate ions, and the carbonate ions in the culturing solution are also collectively referred to as dissolved inorganic carbon. It is considered that the microalgae cultured in the culturing solution take in carbon dioxide into cells primarily in the form of hydrogen carbonate ions, and thereby perform photosynthesis.

In this instance, for example, a culturing device disclosed in JP S60-019989 B2 is known. In a culturing tank of the document, the pH of the culturing solution is continuously measured, and the amount of carbon dioxide gas (pure carbon dioxide gas containing no other gases) supplied to the culturing solution is controlled in accordance with a pH measurement value. For example, when the amount of photosynthesis of the microalgae increases, and the concentration of hydrogen carbonate ions in the culturing solution becomes a low value, the pH of the culturing solution tends to increase. On the other hand, when the amount of photosynthesis of the microalgae decreases, and the concentration of hydrogen carbonate ions in the culturing solution becomes a high value, the pH of the culturing solution tends to decrease. Therefore, when the pH measurement value of the culturing solution has reached an upper limit value of a preset range, the amount of carbon dioxide gas supplied to the culturing solution is increased. Consequently, an insufficiency of carbon dioxide in the culturing solution is suppressed. On the other hand, when the pH measurement value of the culturing solution has reached a lower limit value of the preset range, supply of the carbon dioxide gas with respect to the culturing solution is stopped. Consequently, an excessive supply of the carbon dioxide is suppressed.

SUMMARY OF THE INVENTION

Incidentally, a carbon dioxide fixing capability of the microalgae is comparatively high. Therefore, for example, as a countermeasure against global warming, it has been proposed to supply a factory exhaust gas to the culturing solution, and thereby culture the microalgae using the carbon dioxide contained within the exhaust gas. The amount of exhaust gas discharged from the factory changes depending on the operating conditions and the like of the factory. Further, the concentration of carbon dioxide contained within the exhaust gas changes according to the operating conditions of the factory. It is difficult to apply usage of such an exhaust gas to the aforementioned culturing device, and to control the amount of exhaust gas supplied to the culturing solution in accordance with the pH measurement value of the culturing solution. Stated otherwise, even if the supply amount of the exhaust gas is controlled as in the above-described culturing device, it is difficult to accurately control the amount of carbon dioxide in the culturing solution. In this case, there is a concern that a deficiency or an excessive supply of carbon dioxide in the culturing solution cannot be sufficiently suppressed. Hence, a concern arises in that it may become difficult for the microalgae to be satisfactorily cultured.

Taking the above-described concerns into consideration, it would be desirable to maintain the concentration of hydrogen carbonate ions in the culturing solution within an appropriate range, and to satisfactorily culture the microalgae, without controlling the amount of gas supplied to the culturing solution.

The present invention has the object of solving the aforementioned problems.

One aspect of the present invention is characterized by a culturing method for culturing microalgae in a culturing solution while a gas containing carbon dioxide is supplied to the culturing solution, the culturing method including an ion concentration acquisition step of obtaining an acquired value of a concentration of hydrogen carbonate ions in the culturing solution, and an ion concentration adjustment step of, in the case that the acquired value does not reside within a set concentration range that is set beforehand, adjusting at least one of a temperature or a pH of the culturing solution, and thereby adjusting the concentration of hydrogen carbonate ions in the culturing solution to reside within the set concentration range.

Another aspect of the present invention is characterized by a culturing device configured to culture microalgae in a culturing solution while a gas containing carbon dioxide is supplied to the culturing solution, the culturing device including a culturing tank configured to contain the culturing solution and the microalgae, and to which a gas from a gas supplying unit is supplied, an ion concentration acquisition unit configured to obtain an acquired value of a concentration of hydrogen carbonate ions in the culturing solution inside the culturing tank, a temperature adjustment unit configured to adjust a temperature of the culturing solution, a pH adjustment unit configured to adjust a pH of the culturing solution, and an ion concentration adjustment unit configured to compare the acquired value and a set concentration range that is set beforehand, and to, when the acquired value does not reside within the set concentration range, control at least one of a temperature adjustment by the temperature adjustment unit or a pH adjustment by the pH adjustment unit, and thereby perform an adjustment of the concentration of hydrogen carbonate ions in the culturing solution inside the culturing tank.

According to the present invention, the microalgae are cultured in the culturing solution while a gas containing carbon dioxide gas is supplied to the culturing solution. At this time, the acquired value of the concentration of hydrogen carbonate ions in the culturing solution is obtained. When the acquired value does not reside within the set concentration range that is set beforehand, at least one of the temperature or the pH of the culturing solution is adjusted. For example, by adjusting the temperature of the culturing solution, the amount of carbon dioxide dissolved in the culturing solution (an amount of dissolved inorganic carbon) can be adjusted. Further, by adjusting the pH of the culturing solution, a molar fraction of the hydrogen carbonate ions in the dissolved inorganic carbon can be adjusted.

Therefore, according to the present invention, at least one of the temperature or the pH of the culturing solution is adjusted. In accordance with this feature, regardless of the amount of gas supplied to the culturing solution, the concentration of hydrogen carbonate ions in the culturing solution can be adjusted to reside within the set concentration range that is set beforehand. Consequently, the concentration of hydrogen carbonate ions in the culturing solution can be maintained within an appropriate range that is suitable for culturing the microalgae. As a result, it is possible for the microalgae to be satisfactorily cultured.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
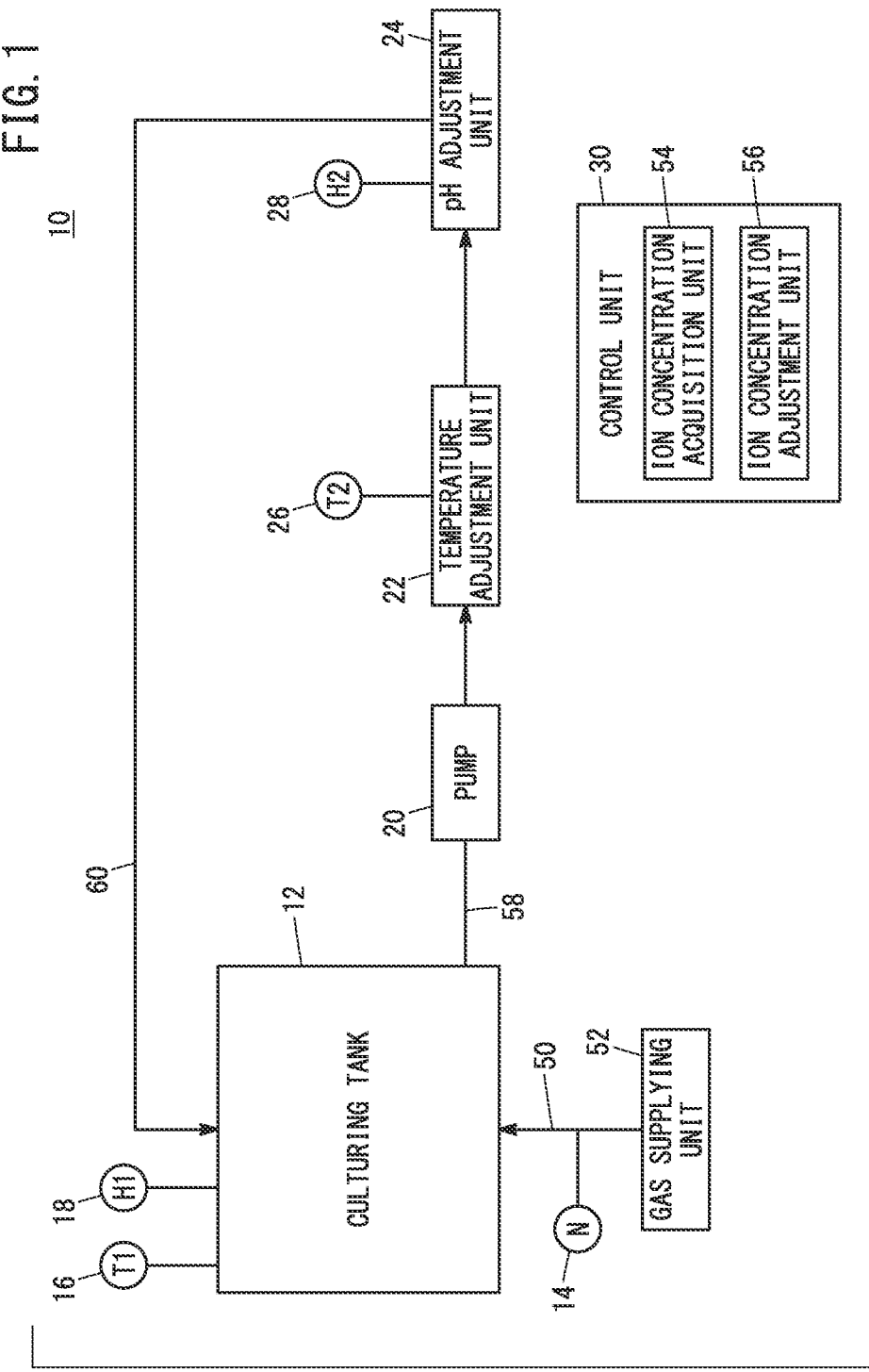
FIG. 1 is a schematic configuration diagram of a culturing device according to an embodiment of the present invention.

Hereinafter, with reference to the accompanying drawings, constituent elements that exhibit the same or similar functions and effects may be designated by the same reference numerals, and repeated description of such features may be omitted.

In a culturing device 10 according to the present embodiment shown in FIG. 1, light and a gas containing carbon dioxide are supplied to microalgae existing within a culturing solution L that contains water. Consequently, in the culturing device 10, the microalgae propagate while carrying out photosynthesis. Stated otherwise, the culturing device 10 cultures the microalgae. Moreover, in addition to water, the culturing solution L preferably contains necessary nutrients for culturing the microalgae. The necessary nutrients, for example, are at least one selected from among nitrogen, phosphorus, and potassium.

The microalgae that are capable of being cultured by the culturing device 10 are not particularly limited. In the case of using the cultured microalgae to produce, for example, a biofuel such as ethanol, it is preferable to culture by the culturing device 10 microalgae which are classified into Chlorophyceae (*chlamydomonas* and *chlorella*), Prasinophyceae, Cryptophyceae, and Cyanophyceae (e.g., *spirulina*). As a suitable example of the microalgae cultured by the culturing device 10, there may be cited the "Honda DREAMO strain" deposited at International Patent Organism Depositary, National Institute of Technology and Evaluation (2-5-8-120 Kazusa-Kamatari, Kisarazu, Chiba, JAPAN). The date of deposit thereof is Apr. 22, 2016, and the accession number is FERM BP-22306.

The culturing device 10 is installed in an environment in which the microalgae can be irradiated with light having a wavelength (for example, 400 to 700 nm) required for growth of the microalgae. As an example of such an environment, there may be cited an outdoor environment where sunlight can be irradiated onto the microalgae. However, the culturing device 10 may be arranged inside a room, for example, where sunlight is capable of being irradiated onto the microalgae. Further, the culturing device 10 may be installed, for example, inside a room where the microalgae can be irradiated with artificial light having the above-described wavelength.

As shown in FIG. 1, the culturing device 10 is equipped with a culturing tank 12, a carbon dioxide sensor 14, an in-tank temperature sensor 16, an in-tank pH sensor 18, a pump 20, a temperature adjustment unit 22, a pH adjustment unit 24, a flow path interior temperature sensor 26, a flow path interior pH sensor 28, and a control unit 30.

Figure 2:
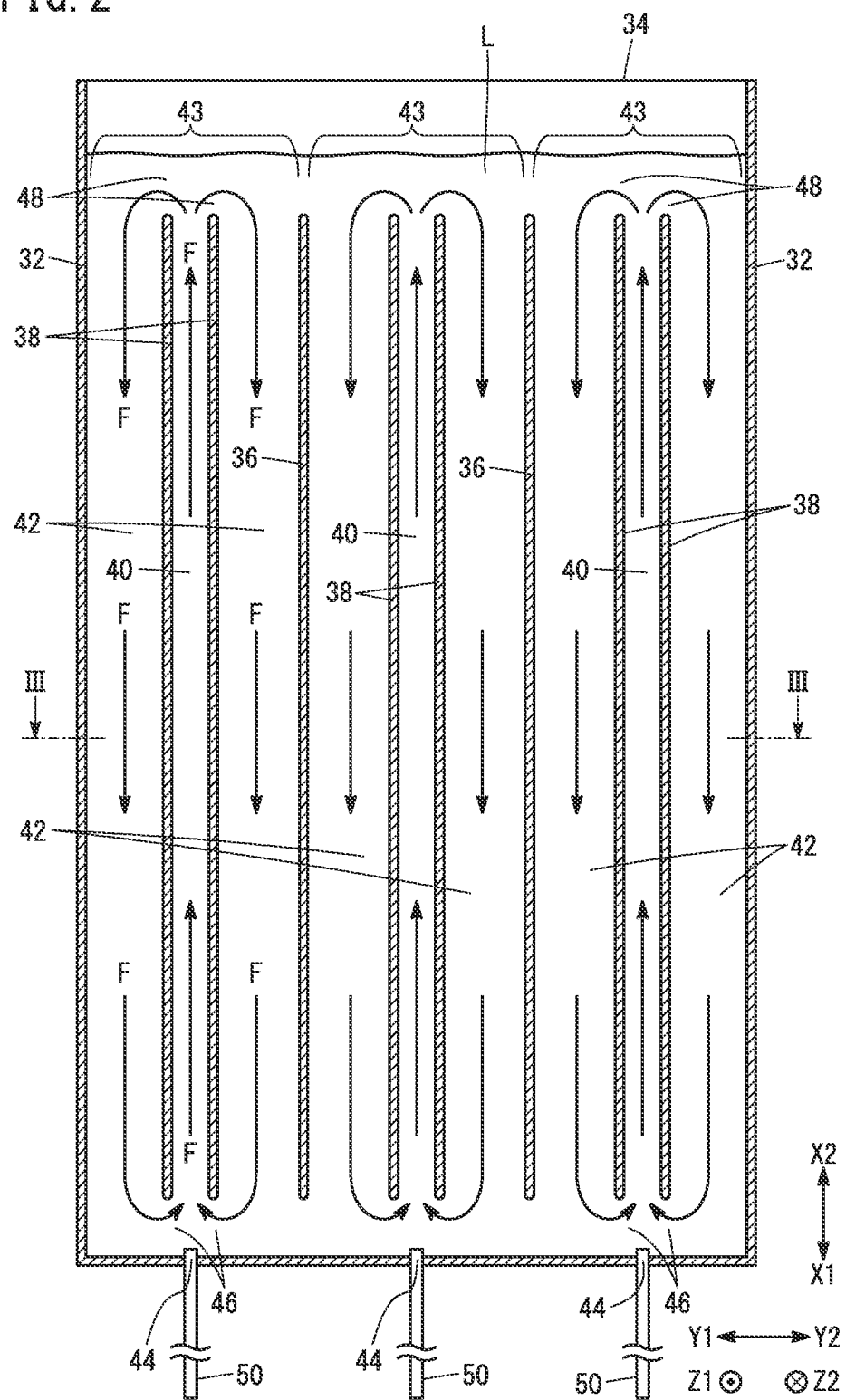
FIG. 2 is a schematic front view of a culturing tank.

As shown in FIG. 2, the culturing tank 12 is capable of accommodating the microalgae and the culturing solution L. The culturing tank 12 is formed from a flexible and translucent material such as linear low density polyethylene (LLDPE). In this instance, the term "translucent" implies that light having a wavelength required for growth of the microalgae can be transmitted through such a material. According to the present embodiment, the culturing tank 12 as a whole is formed from such a translucent material. However, concerning the culturing tank 12, at least the side walls thereof (wall portions excluding the bottom wall and the upper wall) may be formed from a translucent material.

Hereinafter, regarding the orientation of the respective constituent elements of the culturing tank 12, in the case that the culturing tank 12 is installed at an installation location where the microalgae are to be cultured, descriptions will be made with reference to a vertical direction (the direction of arrows X1 and X2, the vertical direction shown in FIG. 2), and horizontal directions perpendicular to the vertical direction. Further, as a preferred example of an orientation in which the culturing tank 12 is installed, among the horizontal directions, an east-west direction is a first horizontal direction (the direction of arrows Y1 and Y2 shown in FIG. 2). Among the horizontal directions, a north-south direction is a second horizontal direction (the direction of arrows Z1 and Z2 shown in FIG. 2). However, the orientation in which the culturing tank 12 is installed is not particularly limited to the above description.

According to the present embodiment, joined edge portions 32 are provided on an outer peripheral edge portion (side portions and a bottom portion) excluding an upper end of the culturing tank 12. The joined edge portions 32 are formed, for example, by joining inner wall surfaces of the culturing tank 12 to each other by fusion bonding. An opening 34 is provided at the upper end of the culturing tank 12 where the joined edge portions 32 are not provided. The opening 34 allows access to the interior of the culturing tank 12. In FIG. 2, for facilitating description thereof, the joined locations formed by fusion bonding are shown by hatched lines.

The opening 34 of the culturing tank 12 may always be kept open toward the exterior of the culturing tank 12. The opening 34 of the culturing tank 12 may also be configured so as to be capable of being opened and closed by a non-illustrated opening/closing member. In the case that culturing of the microalgae is carried out with the opening 34 being kept in an open state, it is possible for an exhaust gas to be discharged from the interior to the exterior of the culturing tank 12 via the opening 34. As for the exhaust gas, as will be described later, among the gas supplied to the interior of the culturing tank 12 through gas supply ports 44, there can be cited a residual gas that is not consumed by photosynthesis of the microalgae. As the exhaust gas, there can also be cited an oxygen containing gas that is generated by photosynthesis.

On the other hand, in the case that the opening 34 of the culturing tank 12 is capable of being opened and closed, for example, the opening 34 may be normally closed. In this case, the opening 34 may be opened only when accessing the interior of the culturing tank 12, such as when the microalgae are collected from the interior of the culturing tank 12. In this manner, in a case in which the microalgae are cultured with the opening 34 being in a closed state, apart from the opening 34, a non-illustrated gas discharge port may be provided at the upper end of the culturing tank 12.

The opening 34 need not necessarily be provided at the upper end of the culturing tank 12. More specifically, although not shown, the joined edge portions 32 may be provided on the entirety of the outer peripheral edge portions including the upper end of the culturing tank 12. In this case, the joined edge portions 32 act to close the space in which the culturing solution L of the culturing tank 12 is accommodated, and isolate the space from the exterior. In such a culturing tank 12, a non-illustrated gas discharge port may be provided which allows communication between the interior and the exterior of the culturing tank 12. The culturing tank 12 may also be provided with a culturing solution supply port (not shown) in order to supply the culturing solution L and the microalgae to the culturing tank. A microalgae recovery port (not shown) may also be provided in order to recover (collect) the microalgae that are cultured inside the culturing tank 12.

In the culturing tank 12, there are provided partitioning members 36, joined portions 38, guide members 40, circulation portions 42, and gas supply ports 44. The culturing tank 12 of the present embodiment includes two of the partitioning members 36, six of the joined portions 38, three of the guide members 40, six of the circulation portions 42, and three of the gas supply ports 44. However, the numbers of the partitioning members 36, the joined portions 38, the guide members 40, the circulation portions 42, and the gas supply ports 44 are not particularly limited.

Each one of the partitioning members 36, the joined portions 38, the guide members 40, and the circulation portions 42 extend along the vertical direction in the interior of the culturing tank 12. It should be noted that the direction in which the partitioning members 36, the joined portions 38, the guide members 40, and the circulation portions 42 extend is not limited to being parallel to the vertical direction, and may be along a direction inclined with respect to the vertical direction.

In the present embodiment, the interior of the culturing tank 12 is divided by the two partitioning members 36 into three regions 43 arranged alongside one another in the first horizontal direction (the direction of arrows Y1 and Y2). By the regions 43 being arranged in this manner alongside one another in the first horizontal direction, the length of the culturing tank 12 in the first horizontal direction is longer than the length of the culturing tank 12 in the second horizontal direction (the direction of arrows Z1 and Z2).

The partitioning members 36 are formed, for example, by joining inner wall surfaces of the culturing tank 12 to each other by fusion bonding. Each of the regions 43 in the culturing tank 12, which are separated by the partitioning members 36, is further partitioned by the joined portions 38. The joined portions 38 are formed, for example, by joining inner wall surfaces of the culturing tank 12 to each other by fusion bonding. Consequently, one of the guide members 40, and two of the circulation portions 42 are formed in each of the regions 43. The two circulation portions 42 are arranged alongside one another on both sides of the guide member 40 in the horizontal direction. Moreover, for example, in order to suppress concentration of stresses, it is preferable that both ends of each of the partitioning members 36 and each of the joined portions 38 in the direction of extension thereof are formed in an arcuate shape.

Figure 3:
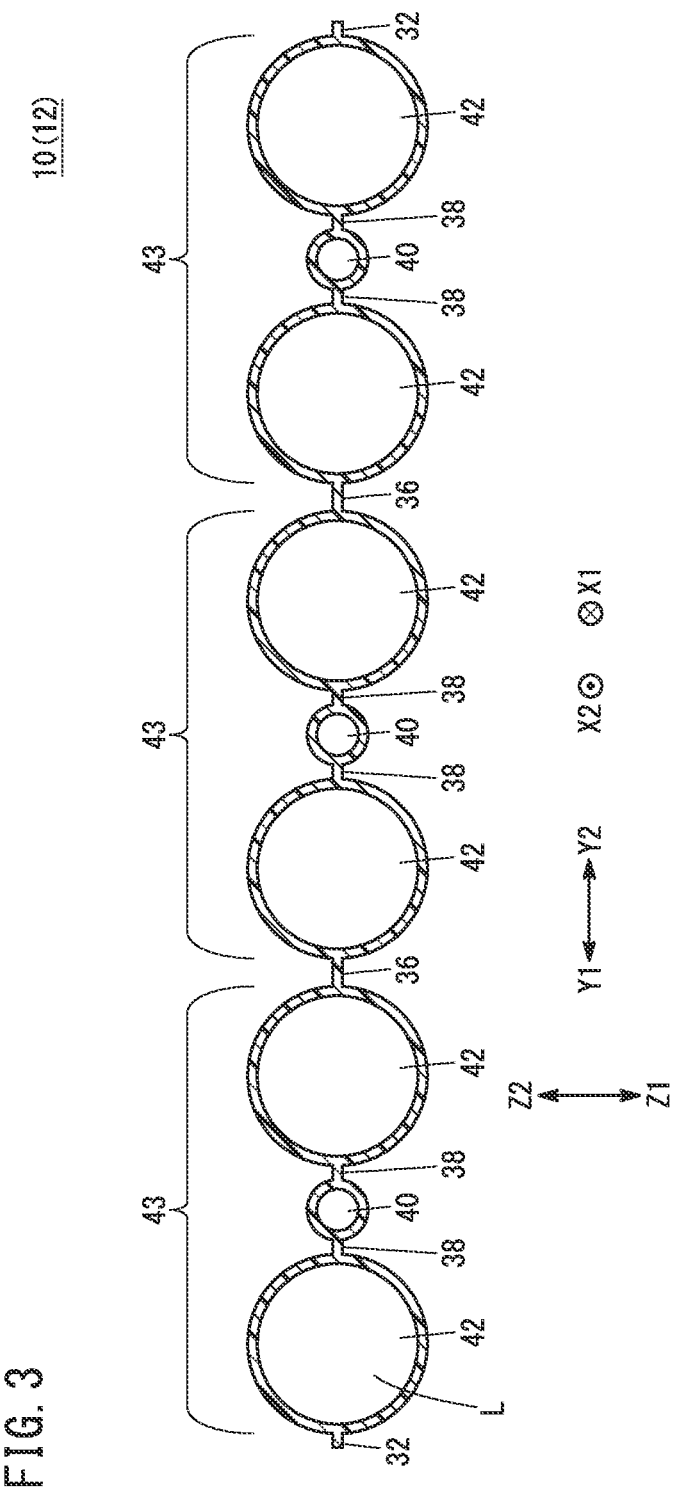
FIG. 3 is a cross-sectional view taken along line III-III of FIG. 2.

As shown in FIG. 3, in the case that the culturing solution L is accommodated in the culturing tank 12, the cross-sectional shape as viewed in the vertical direction of each of the guide members 40 and the circulation portions 42 is a substantially cylindrical shape. According to the present embodiment, the inner diameter of each of the guide members 40 as viewed in the vertical direction is less than or equal to one half of the inner diameter of the circulation portions 42 as viewed in the vertical direction, although the present invention is not particularly limited to this feature.

As shown in FIG. 2, the length of each of the joined portions 38 and the partitioning members 36 in the vertical direction (the direction of extension) is shorter than the length in the vertical direction of the culturing tank 12. Further, the length in the vertical direction of the partitioning members 36 is greater than or equal to the length in the vertical direction of the joined portions 38. Below the joined portions 38 inside the culturing tank 12, guide member inlets 46 are formed that allow communication between the guide members 40 and the circulation portions 42. Further, above the joined portions 38 inside the culturing tank 12, guide member outlets 48 are formed that allow communication between the guide members 40 and the circulation portions 42.

The gas supply ports 44 are disposed at the bottom of the culturing tank 12. The gas supply ports 44 are arranged below the guide members 40 that are provided in the respective regions 43 inside the culturing tank 12. The gas supply ports 44 are connected to a gas supplying unit 52 shown in FIG. 1 via gas supply passages 50. Therefore, gas can be supplied to the interior of the culturing tank 12 via the gas supply passages 50 and the gas supply ports 44. The gas supplied by the gas supplying unit 52 preferably includes, for example, carbon dioxide gas that is discharged from a factory, although the present invention is not particularly limited to this feature.

Since the gas supply ports 44 are provided below the guide members 40, the gas supplied into the culturing tank 12 flows upwardly through the guide members 40. Consequently, in each of the regions 43 inside the culturing tank 12, the culturing solution L in the circulation portions 42 flows into the guide members 40 from the guide member inlets 46. In each of the regions 43 inside the culturing tank 12, the culturing solution L inside the guide members 40 flows out into the circulation portions 42 from the guide member outlets 48. As discussed previously, a culturing solution flow F is generated inside the culturing tank 12.

The culturing tank 12 may be installed in the interior of a non-illustrated liquid storage tank. The liquid storage tank is formed from a translucent material. In this case, the culturing tank 12 is arranged inside a stored liquid possessing a translucent property such as water that is stored in the liquid storage tank. In the interior of the liquid storage tank, for example, the opening 34 at the upper end of the culturing tank 12 is arranged upwardly of the liquid surface of the stored liquid in the liquid storage tank. Consequently, a situation is avoided in which the stored liquid is mixed into the culturing solution L in the culturing tank 12, and in which the culturing solution L is mixed into the stored liquid inside the liquid storage tank. In this manner, the culturing tank 12 is installed inside the liquid storage tank. In accordance with this feature, for example, due to a cooling effect of the stored liquid, it becomes easy to maintain the temperature of the culturing solution L inside the culturing tank 12 at a temperature that is suitable for culturing the microalgae. Therefore, it becomes possible to more satisfactorily culture the microalgae.

As shown in FIG. 1, the carbon dioxide sensor 14 is disposed, for example, in the gas supply passages 50. The carbon dioxide sensor 14 measures a carbon dioxide concentration of the gas supplied to the culturing tank 12. A carbon dioxide concentration measurement value N ($CO_2$ concentration measurement value N) obtained by the carbon dioxide sensor 14 is transmitted to the control unit 30. As the carbon dioxide sensor 14, for example, various types of configurations can be used, such as an optical type (for example, a non-dispersive infrared type), an electrochemical type, and a semiconductor type.

The in-tank temperature sensor 16 measures the temperature of the culturing solution L accommodated inside the culturing tank 12. A temperature measurement value T1 of the culturing solution L inside the culturing tank 12, as obtained by the in-tank temperature sensor 16, is transmitted to the control unit 30. The in-tank pH sensor 18 measures the pH (hydrogen ion index) of the culturing solution L accommodated inside the culturing tank 12. A pH measurement value H1 of the culturing solution L inside the culturing tank 12, as obtained by the in-tank pH sensor 18, is transmitted to the control unit 30.

A culturing solution lead-out passage 58 and a culturing solution recovery passage 60 are provided in the culturing tank 12. The culturing solution lead-out passage 58 enables the culturing solution L inside the culturing tank 12 to be lead out to the exterior of the culturing tank 12. By flowing through the culturing solution lead-out passage 58, the culturing solution recovery passage 60 enables the culturing solution L, in which the concentration of hydrogen carbonate ions has been adjusted as will be described later, to be recovered into the interior the culturing tank 12. Moreover, in FIGS. 2 and 3, illustration of the culturing solution lead-out passage 58 and the culturing solution recovery passage 60 is omitted.

The pump 20 starts operating based on a control from the control unit 30. Consequently, the culturing solution L flows through the culturing solution lead-out passage 58 and the culturing solution recovery passage 60. The pump 20 stops operating based on a control from the control unit 30. Consequently, flowing of the culturing solution L through the culturing solution lead-out passage 58 and the culturing solution recovery passage 60 is stopped. More specifically, by the pump 20 being turned on, leading out of the culturing solution L from the culturing tank 12 into the culturing solution lead-out passage 58 is started. Further, by the pump 20 being turned off, leading out of the culturing solution L from the culturing tank 12 into the culturing solution lead-out passage 58 is stopped.

Based on a control from the control unit 30, the temperature adjustment unit 22 adjusts the temperature of the culturing solution L that is led out into the culturing solution lead-out passage 58. In the vicinity of the temperature adjustment unit 22, the flow path interior temperature sensor 26 is provided for measuring the temperature of the culturing solution L. The temperature adjustment unit 22 performs a temperature adjustment in a manner so that a temperature measurement value T2 obtained by the flow path interior temperature sensor 26 becomes a later-described set temperature. As the temperature adjustment unit 22, for example, a known configuration that is capable of heating or cooling the culturing solution L can be used.

Based on a control from the control unit 30, the pH adjustment unit 24 adjusts the pH of the culturing solution L that is led out into the culturing solution lead-out passage 58. In the vicinity of the pH adjustment unit 24, the flow path interior pH sensor 28 is provided for measuring the pH of the culturing solution L. The pH adjustment unit 24 performs a pH adjustment in a manner so that a pH measurement value H2 obtained by the flow path interior pH sensor 28 becomes a later-described target value. In the present embodiment, the pH adjustment unit 24 adjusts the pH of the culturing solution L by adding hydrochloric acid to the culturing solution L.

The culturing solution L, the pH of which has been adjusted by the pH adjustment unit 24, flows into the culturing solution recovery passage 60. Stated otherwise, under the operation of the pump 20, the culturing solution L that is led out from the interior of the culturing tank 12 into the culturing solution lead-out passage 58, after being adjusted in temperature by the temperature adjustment unit 22 and after being adjusted in pH by the pH adjustment unit 24, is recovered and collected inside the culturing tank 12 via the culturing solution recovery passage 60.

The control unit 30 is configured, for example, in the form of a microcomputer including a non-illustrated CPU or the like. The control unit 30 performs various processes (steps) and controls in relation to the culturing device 10, by executing predetermined calculations in accordance with a control program. The control unit 30 includes an ion concentration acquisition unit 54 and an ion concentration adjustment unit 56.

The ion concentration acquisition unit 54 obtains an acquired value of the concentration of hydrogen carbonate ions ($HCO_3^-$) in the culturing solution L inside the culturing tank 12. According to the present embodiment, the ion concentration acquisition unit 54 obtains the acquired value by way of a calculation based on the $CO_2$ concentration measurement value N of the carbon dioxide sensor 14, the temperature measurement value T1 of the in-tank temperature sensor 16, and the pH measurement value H1 of the in-tank pH sensor 18.

A relationship (solubility curve) between the temperature of the culturing solution L and the solubility of the carbon dioxide in the culturing solution L is known. Therefore, the ion concentration acquisition unit 54 is capable of identifying, from the $CO_2$ concentration measurement value N and the temperature measurement value T1, a dissolved inorganic carbon concentration of the culturing solution L inside the culturing tank 12. Further, a relationship between the pH and the molar fraction of the hydrogen carbonate ions, as determined for each of respective temperatures of the culturing solution L, is known. Therefore, from the pH measurement value H1, the ion concentration acquisition unit 54 is capable of identifying the molar fraction (a degree of ionization of carbonic acid) of the hydrogen carbonate ions in the culturing solution L inside the culturing tank 12. The acquired value can be obtained by a calculation using the dissolved inorganic carbon concentration and the molar fraction of the hydrogen carbonate ions in the culturing solution L inside the culturing tank 12, which have been identified in the manner described above.

The ion concentration adjustment unit 56 adjusts the concentration of hydrogen carbonate ions in the culturing solution L inside the culturing tank 12. More specifically, at first, the ion concentration adjustment unit 56 compares the acquired value acquired by the ion concentration acquisition unit 54 with the set concentration range that is set beforehand. The set concentration range is a range within which the concentration of hydrogen carbonate ions in the culturing solution L enables the microalgae to be satisfactorily cultured. The set concentration range can be set beforehand, for example, according to the type of microalgae being cultured. For example, in the case that the microalgae to be cultured are general *chlamydomonas* or the aforementioned "Honda DREAMO strain" which is a mutant strain thereof, the set concentration range is preferably $100 \times 10^{-3}$ to $300 \times 10^{-3}$ mol/L.

When the acquired value does not reside within the set concentration range, the ion concentration adjustment unit 56 adjusts the concentration of hydrogen carbonate ions. The adjustment of the concentration of hydrogen carbonate ions can be carried out by controlling at least one of the temperature adjustment by the temperature adjustment unit 22 or the pH adjustment by the pH adjustment unit 24. In the culturing solution lead-out passage 58 of the present embodiment, the pH adjustment unit 24 is disposed at a subsequent stage after the temperature adjustment unit 22. Therefore, the ion concentration adjustment unit 56 performs the pH adjustment by the pH adjustment unit 24 after having performed the temperature adjustment by the temperature adjustment unit 22. However, the present invention is not limited to this feature, and in the culturing solution lead-out passage 58, the pH adjustment unit 24 may be disposed at a prior stage in front of the temperature adjustment unit 22. In this case, the ion concentration adjustment unit 56 performs the temperature adjustment by the temperature adjustment unit 22 after having performed the pH adjustment by the pH adjustment unit 24.

More specifically, the ion concentration adjustment unit 56 controls the temperature adjustment unit 22 in a manner so that the temperature measurement value T2 of the flow path interior temperature sensor 26 becomes a set temperature that is set beforehand. The set temperature in this instance is a temperature selected from a temperature range for the culturing solution L within which the microalgae are capable of being satisfactorily cultured. The set temperature can be set beforehand, for example, according to the type of microalgae being cultured.

In the present embodiment, in the case that the acquired value exceeds the set concentration range, an upper limit value (maximum temperature) of the above-described temperature range is selected and set as a set temperature Tmax. On the other hand, in the case that the acquired value falls below the set concentration range, a lower limit value (minimum temperature) of the above-described temperature range is selected and set as a set temperature Tmin. Moreover, the set temperature Tmax and the set temperature Tmin are collectively referred to as set temperatures.

For example, in the case that the microalgae being cultured in the culturing tank 12 are the aforementioned "Honda DREAMO strain," it is preferable for the set temperature Tmax to be 37° C. and for the set temperature Tmin to be 14° C. Further, for example, in the case that the microalgae being cultured in the culturing tank 12 are a general *chlamydomonas*, it is preferable for the set temperature Tmax to be 35° C. and for the set temperature Tmin to be 18° C.

The ion concentration adjustment unit 56 controls the pH adjustment unit 24 in a manner so that the pH measurement value H2 of the flow path interior pH sensor 28 becomes a target value that is set beforehand. The target value in this instance is the pH at which the concentration of hydrogen carbonate ions in the culturing solution L resides within the aforementioned set concentration range. The target value can be obtained based on a relationship between the pH and the molar fraction of the hydrogen carbonate ions when the culturing solution L is at the set temperature. More specifically, a target value A1 of the pH in the case that the acquired value exceeds the set concentration range is obtained based on the relationship between the pH and the molar fraction of the hydrogen carbonate ions when the culturing solution L is at the set temperature Tmax. On the other hand, a target value A2 of the pH in the case that the acquired value falls below the set concentration range is obtained based on the relationship between the pH and the molar fraction of the hydrogen carbonate ions when the culturing solution L is at the set temperature Tmin. Moreover, the target value A1 and the target value A2 are collectively referred to as target values.

In the foregoing manner, the temperature adjustment is carried out by the temperature adjustment unit 22, and the pH adjustment is carried out by the pH adjustment unit 24. In accordance therewith, the culturing solution L, in which the concentration of hydrogen carbonate ions is adjusted to reside within the set concentration range, is recovered and collected in the culturing tank 12 via the culturing solution recovery passage 60. Consequently, the concentration of hydrogen carbonate ions in the culturing solution L inside the culturing tank 12 is adjusted to reside within the set concentration range.

Figure 4:
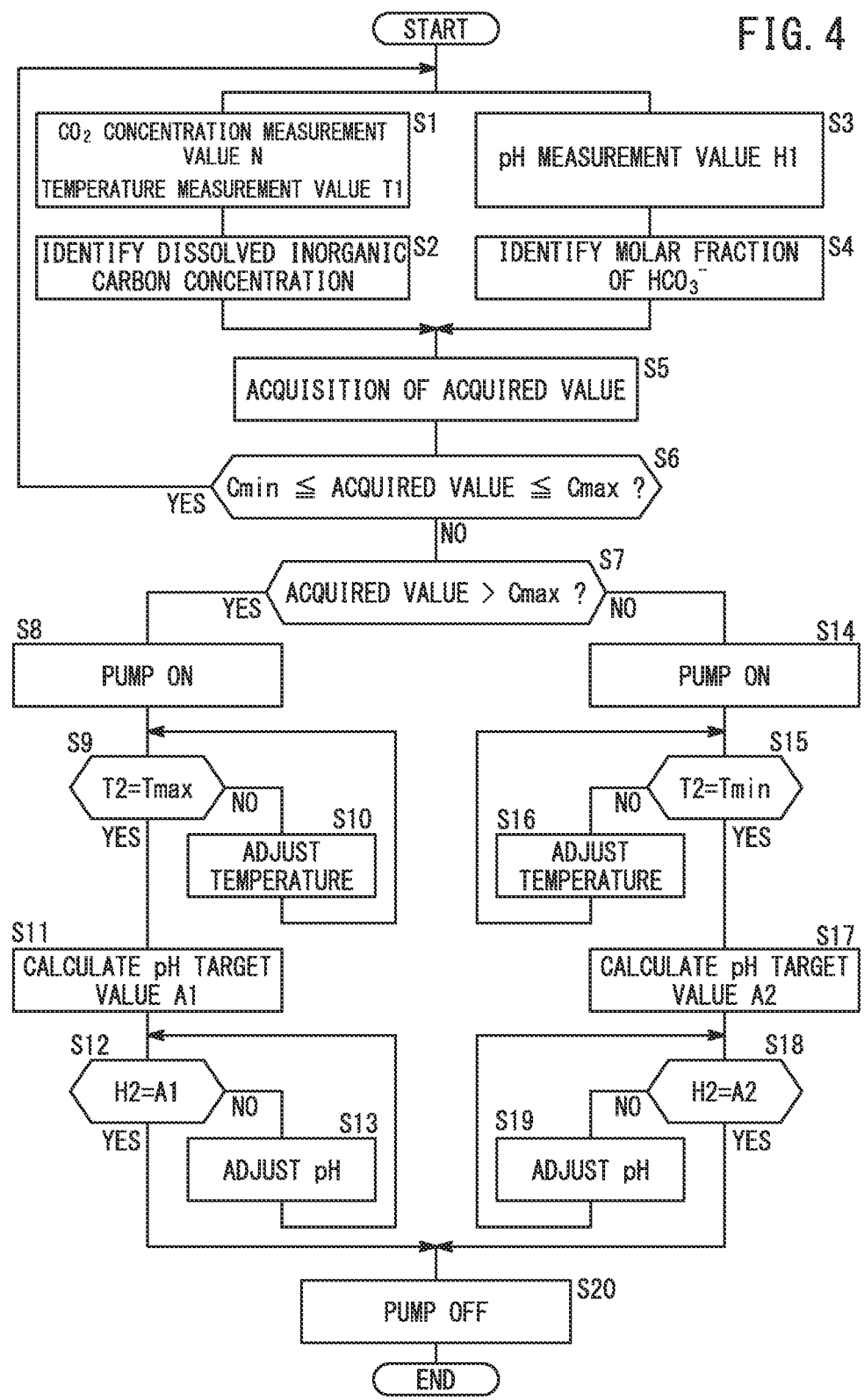
FIG. 4 is a flowchart illustrating an example of a culturing method according to an embodiment of the present invention.

The culturing device 10 according to the present embodiment is basically configured in the manner described above. Hereinafter, with reference to the flowchart shown in FIG. 4, a description will be given of an example of a culturing method according to the present embodiment. In such a culturing method, as a preparatory step, the culturing tank 12 shown in FIG. 2 is arranged inside the stored liquid that is stored in the liquid storage tank. In this state, the culturing solution L, which is supplied from a non-illustrated culturing solution supply mechanism, is accommodated in the interior of the culturing tank 12. In this manner, by supplying the culturing solution L into the culturing tank 12 that is arranged inside the storage liquid, it is possible to prevent the culturing tank 12 from becoming damaged due to the solution pressure of the culturing solution L. The microalgae are accommodated inside the culturing tank 12 together with the culturing solution L.

Next, as shown in FIG. 2, the gas, which is supplied from the gas supplying unit 52 into the gas supply passages 50, is supplied via the gas supply ports 44 to the guide members 40 of the respective regions 43 inside the culturing tank 12. Consequently, the gas can be dissolved into the culturing solution L inside the culturing tank 12, together with the culturing solution flow F being generated in each of the regions 43 of the culturing tank 12. Due to the culturing solution flow F, the microalgae are circulated together with the culturing solution L. Therefore, the microalgae can be satisfactorily dispersed inside the culturing tank 12. As a result, inside the culturing tank 12, the microalgae, to which the gas and the light are efficiently supplied, grow and propagate while photosynthesis is performed.

The side walls of the culturing tank 12 are formed from a translucent material. Therefore, the microalgae can be irradiated through the side walls of the culturing tank 12 with light such as sunlight. Consequently, it is possible to ensure a large light receiving area with respect to the volume in which the microalgae are cultured, as compared with culturing that takes place in a so-called open pond (raceway pond). As a result, it becomes possible to distribute the light energy, in which an excess or deficiency of light is suppressed, to a greater amount of the microalgae inside the culturing tank 12.

At a time of culturing when the microalgae are cultured in the manner described above, an ion concentration acquisition step (step S1 to step S5 of FIG. 4) for acquiring the acquired value of the concentration of hydrogen carbonate ions in the culturing solution L inside the culturing tank 12 is performed. In the ion concentration acquisition step, in step S1, the $CO_2$ concentration measurement value N is obtained from the carbon dioxide sensor 14 shown in FIG. 1. Further, the temperature measurement value T1 is obtained from the in-tank temperature sensor 16 shown in FIG. 1. Next, in step S2, based on the $CO_2$ concentration measurement value N and the temperature measurement value T1 obtained in step S1, the dissolved inorganic carbon concentration of the culturing solution L inside the culturing tank 12 is identified.

In the ion concentration acquisition step, in step S3, the pH measurement value H1 is obtained from the in-tank pH sensor 18 shown in FIG. 1. Next, in step S4, the molar fraction of the hydrogen carbonate ions ($HCO_3^-$) in the culturing solution L inside the culturing tank 12 is identified based on the pH measurement value H1 obtained in step S3.

Next, in step S5, the acquired value (the concentration of hydrogen carbonate ions in the culturing solution L inside the culturing tank 12) is acquired by way of a calculation from the dissolved inorganic carbon concentration of the culturing solution L inside the culturing tank 12 identified in step S2, and the molar fraction of the hydrogen carbonate ions in the culturing solution L inside the culturing tank 12 identified in step S4.

After the ion concentration acquisition step is performed in the manner described above, a determination step (step S6 and step S7 of FIG. 4) is performed. In the determination step, at first, in step S6, a determination is made as to whether or not the acquired value acquired in the ion concentration acquisition step resides within the set concentration range that is set beforehand. More specifically, in step S6, a determination is made as to whether or not the acquired value is less than or equal to a maximum concentration Cmax, which is an upper limit value of the set concentration range, and greater than or equal to a minimum concentration Cmin, which is a lower limit value of the set concentration range.

In the case it is determined in step S6 that the acquired value resides within the set concentration range (step S6: YES), it can be determined that the concentration of hydrogen carbonate ions in the culturing solution L inside the culturing tank 12 resides within an appropriate range that enables the microalgae to be cultured satisfactorily. Therefore, without adjusting the concentration of the hydrogen carbonate ions in the culturing solution L, in succession, the procedure returns to the ion concentration acquisition step, and monitoring of the concentration of hydrogen carbonate ions in the culturing solution L inside the culturing tank 12 is continued.

On the other hand, in the case it is determined in step S6 that the acquired value does not reside within the set concentration range (step S6: NO), the procedure proceeds to step S7, and a determination is further made as to whether the acquired value exceeds or falls below the set concentration range. Stated otherwise, in step S7, for example, a determination is made as to whether or not the acquired value is greater than Cmax.

In the case it is determined in step S7 that the acquired value is greater than Cmax, and more specifically, in the case it is determined that the acquired value exceeds the set concentration range (step S7: YES), then for example, it can be determined that the concentration of hydrogen carbonate ions in the culturing solution L inside the culturing tank 12 has a tendency of being excessive. Therefore, as shown in step S8 to step S13 of FIG. 4, an ion concentration adjustment step for lowering the concentration of hydrogen carbonate ions in the culturing solution L inside the culturing tank 12 is performed.

In such an ion concentration adjustment step, at first, in step S8, the pump 20 shown in FIG. 1 is turned on. Consequently, the culturing solution L is led out from the culturing tank 12 into the culturing solution lead-out passage 58. Therefore, by the temperature adjustment unit 22 and the pH adjustment unit 24 that are provided in the culturing solution lead-out passage 58, it becomes possible to perform an adjustment of the concentration of hydrogen carbonate ions in the culturing solution L.

Next, in step S9 and step S10, the temperature of the culturing solution L is adjusted in a manner so that the temperature measurement value T2 of the culturing solution L obtained by the flow path interior temperature sensor 26 becomes the set temperature Tmax. As noted previously, the adjustment for lowering the concentration of hydrogen carbonate ions in the culturing solution L is an adjustment for decreasing the solubility of the carbon dioxide gas. More specifically, an adjustment is made for increasing the temperature of the culturing solution L. Therefore, the temperature measurement value T2 is set to the set temperature Tmax, which is the upper limit value of the set temperature range in which the microalgae can be suitably cultured.

More specifically, in step S9, it is determined whether or not the temperature measurement value T2 has become the set temperature Tmax. In the case it is determined in step S9 that the temperature measurement value T2 has not become the set temperature Tmax (step S9: NO), the procedure proceeds to step S10, and the temperature adjustment unit 22 adjusts the temperature of the culturing solution L. After having carried out the adjustment of the temperature in step S10, the procedure returns again to step S9. In this manner, the procedures of step S9 and step S10 are repeatedly executed until the temperature measurement value T2 becomes the set temperature Tmax.

In the case it is determined in step S9 that the temperature measurement value T2 has become the set temperature Tmax (step S9: YES), the procedure proceeds to step S11. In step S11, step S12, and step S13, the pH of the culturing solution L is adjusted in a manner so that the pH measurement value H2 of the culturing solution L obtained by the flow path interior pH sensor 28 becomes the target value A1.

More specifically, in step S11, the target value A1 is calculated. As noted previously, the relationship between the pH and the molar fraction of the hydrogen carbonate ions is known. Further, the dissolved inorganic carbon concentration of the culturing solution L is identified by step S1 and step S2. Furthermore, the culturing solution L is adjusted to the set temperature Tmax. Therefore, the molar fraction of the hydrogen carbonate ions at which the concentration of hydrogen carbonate ions in the culturing solution L at the set temperature Tmax resides within the set concentration range, can be calculated. In addition, the pH corresponding to the calculated molar fraction of the hydrogen carbonate ions can be calculated as the target value A1. Stated otherwise, the target value A1 is the pH at which the concentration of the hydrogen carbonate ions in the culturing solution L at the set temperature Tmax resides within the set concentration range.

In step S12, it is determined whether or not the pH measurement value H2 has become the target value A1. In the case it is determined in step S12 that the pH value H2 has not become the target value A1 (step S12: NO), the procedure proceeds to step S13, and the pH adjustment unit 24 adjusts the pH of the culturing solution L. After having carried out the adjustment of the pH in step S13, the procedure returns again to step S12. In this manner, the procedures of step S12 and step S13 are repeatedly executed until the pH measurement value H2 becomes the target value A1. In the case it is determined in step S12 that the pH measurement value H2 has become the target value A1 (step S12: YES), the procedure proceeds to step S20.

On the other hand, in the case it is determined in step S7 that the acquired value has not become greater than Cmax, and more specifically, in the case it is determined that the acquired value falls below the set concentration range (step S7: NO), then for example, It can be determined that the concentration of hydrogen carbonate ions in the culturing solution L inside the culturing tank 12 has a tendency of being insufficient. Therefore, as shown in step S14 to step S19 of FIG. 4, an ion concentration adjustment step of raising the concentration of hydrogen carbonate ions in the culturing solution L inside the culturing tank 12 is performed.

In such an ion concentration adjustment step, at first, in step S14, the pump 20 shown in FIG. 1 is turned on. Consequently, the culturing solution L is led out from the culturing tank 12 into the culturing solution lead-out passage 58. Therefore, by the temperature adjustment unit 22 and the pH adjustment unit 24 that are provided in the culturing solution lead-out passage 58, it becomes possible to perform an adjustment of the concentration of hydrogen carbonate ions in the culturing solution L.

Next, in step S15 and step S16, the temperature of the culturing solution L is adjusted in a manner so that the temperature measurement value T2 of the culturing solution L obtained by the flow path interior temperature sensor 26 becomes the set temperature Tmin. As noted previously, the adjustment for raising the concentration of hydrogen carbonate ions in the culturing solution L is an adjustment for increasing the solubility of the carbon dioxide gas. More specifically, an adjustment is made for lowering the temperature of the culturing solution L. Therefore, the temperature measurement value T2 is set to the set temperature Tmin, which is the lower limit value of the set temperature range in which the microalgae can be suitably cultured.

More specifically, in step S15, it is determined whether or not the temperature measurement value T2 has become the set temperature Tmin. In the case it is determined in step S15 that the temperature measurement value T2 has not become the set temperature Tmin (step S15: NO), the procedure proceeds to step S16, and the temperature adjustment unit 22 adjusts the temperature of the culturing solution L. After having carried out the adjustment of the temperature in step S16, the procedure returns again to step S15. In this manner, the procedures of step S15 and step S16 are repeatedly executed until the temperature measurement value T2 becomes the set temperature Tmin.

In the case it is determined in step S15 that the temperature measurement value T2 has become the set temperature Tmin (step S15: YES), the procedure proceeds to step S17. In step S17, step S18, and step S19, the pH of the culturing solution L is adjusted in a manner so that the pH measurement value H2 of the culturing solution L obtained by the flow path interior pH sensor 28 becomes the target value A2.

More specifically, in step S17, the target value A2 is calculated. The target value A2 can be calculated in the same manner as the target value A1, by using, for example, the set temperature Tmin, instead of the set temperature Tmax from among the parameters used for calculating the above-described target value A1. More specifically, the target value A2 is the pH at which the concentration of the hydrogen carbonate ions in the culturing solution L at the set temperature Tmin resides within the set concentration range.

In step S18, it is determined whether or not the pH measurement value H2 has become the target value A2. In the case it is determined in step S18 that the pH value H2 has not become the target value A2 (step S18: NO), the procedure proceeds to step S19, and the pH adjustment unit 24 adjusts the pH of the culturing solution L. After having carried out the adjustment of the pH in step S19, the procedure returns again to step S18. In this manner, the procedures of step S18 and step S19 are repeatedly executed until the pH measurement value H2 becomes the target value A2. In the case it is determined in step S18 that the pH measurement value H2 has become the target value A2 (step S18: YES), the procedure proceeds to step S20.

The culturing solution L, the temperature and the pH of which have been adjusted through the steps described above, is adjusted in a manner so that the concentration of hydrogen carbonate ions resides within the set concentration range. Therefore, in step S20, the pump 20 in FIG. 1 is turned off, so that leading out of the culturing solution L from the culturing tank 12 into the culturing solution lead-out passage 58 is stopped. After the process of step S20 is completed, the flowchart according to the present embodiment comes to an end. Moreover, after the process of step S20 is completed, in succession, the procedure may return to the ion concentration acquisition step, and monitoring of the concentration of hydrogen carbonate ions in the culturing solution L inside the culturing tank 12 may be continued.

In the culturing method and the culturing device 10 according to the embodiment described above, the concentration of hydrogen carbonate ions is adjusted by adjusting both the temperature and the pH of the culturing solution L. However, the present invention is not limited to this feature. For example, the concentration of hydrogen carbonate ions may be adjusted by adjusting at least one of the temperature and the pH of the culturing solution L.

From the foregoing description, in the culturing method and the culturing device 10 according to the present embodiment, the microalgae are cultured in the culturing solution L while the gas containing carbon dioxide gas is supplied to the culturing solution L. At this time, the acquired value of the concentration of hydrogen carbonate ions in the culturing solution L is obtained. When the acquired value does not reside within the set concentration range that is set beforehand, at least one of the temperature or the pH of the culturing solution L is adjusted. For example, by adjusting the temperature of the culturing solution L, the amount of carbon dioxide dissolved in the culturing solution L (the amount of dissolved inorganic carbon) can be adjusted. Further, by adjusting the pH of the culturing solution L, the molar fraction of the hydrogen carbonate ions in the dissolved inorganic carbon can be adjusted.

Therefore, in accordance with the culturing method and the culturing device 10 according to the present embodiment, at least one of the temperature or the pH of the culturing solution L is adjusted. In accordance with this feature, regardless of the amount of gas supplied to the culturing solution L, the concentration of hydrogen carbonate ions in the culturing solution L can be adjusted to reside within the set concentration range that is set beforehand. Consequently, the concentration of hydrogen carbonate ions in the culturing solution L can be maintained within an appropriate range that is suitable for culturing the microalgae. As a result, it is possible for the microalgae to be satisfactorily cultured.

The carbon dioxide concentration of the exhaust gas discharged from a factory is likely to fluctuate depending on, for example, the operating conditions of the factory. Concerning the exhaust gas discharged from the factory, for example, depending on the operating conditions of the factory, it tends to be difficult to adjust the amount of gas that is supplied. According to the present invention, even in the case that the microalgae are cultured by the exhaust gas from such a factory being supplied to the culturing solution L, the concentration of hydrogen carbonate ions in the culturing solution L can be maintained within an appropriate range.

In the culturing method according to the above-described embodiment, in the ion concentration adjustment step, in the case of adjusting the pH of the culturing solution L, hydrochloric acid is added to the culturing solution L. Further, in the culturing device 10 according to the aforementioned embodiment, the pH adjustment unit 24 adjusts the pH of the culturing solution L by adding hydrochloric acid to the culturing solution L.

In the foregoing manner, even if hydrochloric acid is added to the culturing solution L, since the influence imparted on the growth of microalgae is comparatively small, the microalgae can be cultured satisfactorily. Moreover, in particular, in the aforementioned "Honda DREAMO strain," the resistance with respect to chlorine is high. Therefore, even if the pH of the culturing solution L is adjusted using hydrochloric acid, it is possible for the aforementioned "Honda DREAMO strain" to be satisfactorily cultured.

Further, handling of hydrochloric acid is easier than handling of, for example, other strong acids and strong alkalis. Therefore, even if the pH of the culturing solution L is adjusted using hydrochloric acid, the equipment constituting the pH adjustment unit 24 is less subject to restrictions. Further, when culturing the microalgae, for example, there is a tendency for the pH of the culturing solution L to easily become higher than the target values A1 and A2 due to the influence of bacteria mixed within the culturing solution L. Therefore, by the hydrochloric acid being added to the culturing solution L by the pH adjustment unit 24, the pH can be satisfactorily adjusted to the target values A1 and A2.

In the culturing method according to the above-described embodiment, in the ion concentration adjustment step, the temperature of the culturing solution L is adjusted so as to become the set temperature that is set beforehand, and based on the relationship between the pH and the molar fraction of the hydrogen carbonate ions when the culturing solution L is at the set temperature, a target value of the pH at which the concentration of hydrogen carbonate ions in the culturing solution L resides within the set concentration range is calculated, and the pH of the culturing solution L is adjusted to the target value.

In this case, the temperature of the culturing solution L is adjusted to the set temperature that resides within the temperature range that is suitable for culturing the microalgae. By adjusting the pH according to such a set temperature, the concentration of hydrogen carbonate ions in the culturing solution L can be maintained within the set concentration range. In this manner, by adjusting the temperature of the culturing solution L to reside within the temperature range that is suitable for culturing the microalgae, the efficiency with which the microalgae are cultured can be effectively improved.

However, instead of adjusting the pH in accordance with the set temperature of the culturing solution L in the manner described above, the temperature of the culturing solution L may be adjusted in accordance with the set value of the pH. In this case as well, regardless of the amount of gas supplied to the culturing solution L, the concentration of hydrogen carbonate ions can be adjusted to reside within the set concentration range. Hence, it is possible for the microalgae to be satisfactorily cultured.

Moreover, in the aforementioned "Honda DREAMO strain," the temperature range of the culturing solution L within which the strain can be suitably cultured is wider than that of other microalgae. Therefore, the set temperature range for the culturing solution L can be widened. Consequently, it becomes possible to adjust the concentration of the hydrogen carbonate ions with higher accuracy.

In the case of culturing the "Honda DREAMO strain," it is preferable to adjust the temperature of the culturing solution L to the set temperature, and thereafter, to adjust the pH. As noted previously, in the "Honda DREAMO strain," the set temperature range of the culturing solution L can be made wider. Therefore, the concentration of hydrogen carbonate ions can be satisfactorily adjusted by adjusting the temperature. Furthermore, by adjusting the pH as needed, it becomes possible to adjust the concentration of the hydrogen carbonate ions with higher accuracy.

In the culturing method according to the present embodiment, there is further included the determination step of determining, prior to the ion concentration adjustment step, whether or not the acquired value resides within the set concentration range, in the determination step, in the case it is determined that the acquired value does not reside within the set concentration range, a further determination is made as to whether the acquired value exceeds or falls below the set concentration range, and in the ion concentration adjustment step, in the case it is determined in the determination step that the acquired value exceeds the set concentration range, the set temperature is set to the upper limit value (Tmax) of the set temperature range that is set beforehand, whereas in the case it is determined in the determination step that the acquired value falls below the set concentration range, the set temperature is set to the lower limit value (Tmin) of the set temperature range.

In this case, the set temperature can be set by effectively utilizing the temperature range that is suitable for culturing the microalgae. Therefore, by means of a simple control, it is possible to adjust the concentration of the hydrogen carbonate ions with high accuracy, while the temperature of the culturing solution L is maintained within the temperature range that is suitable for culturing the microalgae. However, the set temperature is not limited to the upper limit value or the lower limit value of the set temperature range. The set temperature is capable of being set at various temperatures within the temperature range that is suitable for culturing the microalgae.

In the ion concentration acquisition step of the culturing method according to the above-described embodiment, the acquired value is obtained by a calculation based on the carbon dioxide concentration measurement value N (the $CO_2$ concentration measurement value N) of the gas supplied to the culturing solution L, the pH measurement value H1 of the culturing solution L, and the temperature measurement value T1 of the culturing solution L.

Further, in the culturing device 10 according to the above-described embodiment, there are further provided the carbon dioxide sensor 14 that measures the carbon dioxide concentration of the gas supplied from the gas supplying unit 52, the In-tank temperature sensor 16 that measures the temperature of the culturing solution L inside the culturing tank 12, and the in-tank pH sensor 18 that measures the pH of the culturing solution L inside the culturing tank 12, wherein the ion concentration acquisition unit 54 obtains the acquired value by a calculation based on the carbon dioxide concentration measurement value N (the $CO_2$ concentration measurement value N) of the carbon dioxide sensor 14, the temperature measurement value T1 of the in-tank temperature sensor 16, and the pH measurement value H1 of the in-tank pH sensor 18.

Each of the $CO_2$ concentration measurement value N, the pH measurement value H1, and the temperature measurement value T1 can be rapidly acquired using a comparatively simple configuration. Therefore, for example, compared to a case in which the concentration of hydrogen carbonate ions in the culturing solution L is directly measured using a non-illustrated measurement device, the acquired values can be obtained quickly and easily. Hence, the culturing method and the culturing device 10 according to the present embodiment can be easily applied to culturing a large amount of the microalgae. Further, it is possible to shorten the time from the start of measuring the concentration of hydrogen carbonate ions inside the culturing solution L until the acquired values are obtained. Consequently, it becomes possible to adjust with high accuracy the concentration of hydrogen carbonate ions in the culturing solution L.

In the culturing device 10 according to the above-described embodiment, the guide members 40, which extend along the vertical direction, are provided in the interior of the culturing tank 12, and by the gas being supplied upwardly, the guide members 40 draw in the culturing solution L from below the guide members 40, and discharge the culturing solution L from above the guide members 40, thereby generating the culturing solution flow F inside the culturing tank 12.

Incidentally, although not illustrated, for example, in the culturing device 10 that adjusts the amount of carbon dioxide in the culturing solution L by adjusting the amount of gas supplied to the culturing tank 12, it is necessary to change the gas supply amount or stop the gas supply, in accordance with the amount of carbon dioxide in the culturing solution L. It is difficult for such a culturing device 10 to be applied to the culturing tank 12 in which the culturing solution flow F is generated utilizing the circulation of gas.

However, with the culturing device 10 according to the present embodiment, as described previously, the concentration of hydrogen carbonate ions can be adjusted to reside within the set concentration range, regardless of the amount of gas supplied to the culturing solution L. Therefore, it is possible for the culturing device 10 to be applied to the culturing tank 12 in which the culturing solution flow F is generated utilizing the circulation of gas. In this case, the culturing solution flow F can be generated by means of a simple configuration in which the gas is supplied to the guide members 40. Consequently, the microalgae can be suitably dispersed inside the culturing tank 12. Further, there is no need to drive a configuration provided solely for generating the culturing solution flow F. Accordingly, with a simple configuration, it becomes possible for the microalgae to be satisfactorily cultured, while suppressing an increase in energy consumption. The configuration of the culturing tank 12 is not particularly limited, and for example, the guide members 40 need not necessarily be provided inside the culturing tank 12.

In should be understood that the present invention is not limited to the embodiment described above, and various additional or modified configurations could be adopted therein without departing from the essence and gist of the present invention.

What is claimed is:

1. A culturing method for culturing microalgae in a culturing solution while a gas containing carbon dioxide is supplied to the culturing solution, the culturing method comprising:
    an ion concentration acquisition step of obtaining an acquired value of a concentration of hydrogen carbonate ions in the culturing solution; and
    an ion concentration adjustment step of, in a case that the acquired value does not reside within a set concentration range that is set beforehand, performing at least one of adjusting of a molar fraction of the hydrogen carbonate ions in the culturing solution by adjusting a pH of the culturing solution or adjusting of an amount of carbon dioxide dissolved in the culturing solution by adjusting a temperature of the culturing solution without adjusting a concentration of carbon dioxide in the gas, and thereby adjusting the concentration of hydrogen carbonate ions in the culturing solution to reside within the set concentration range.

2. The culturing method according to claim 1, wherein in the ion concentration adjustment step, in a case of adjusting the pH of the culturing solution, hydrochloric acid is added to the culturing solution.

3. The culturing method according to claim 1, wherein in the ion concentration adjustment step, the temperature of the culturing solution is adjusted so as to become a set temperature that is set beforehand, and based on a relationship between the pH and a molar fraction of the hydrogen carbonate ions when the culturing solution is at the set temperature, a target value of the pH at which the concentration of hydrogen carbonate ions in the culturing solution resides within the set concentration range is calculated, and the pH of the culturing solution is adjusted to the target value.

4. The culturing method according to claim 3, further comprising:
    a determination step of determining, prior to the ion concentration adjustment step, whether or not the acquired value resides within the set concentration range;
    in the determination step, in a case it is determined that the acquired value does not reside within the set concentration range, a further determination is made as to whether the acquired value exceeds or falls below the set concentration range; and
    in the ion concentration adjustment step:
    in a case it is determined in the determination step that the acquired value exceeds the set concentration range, the set temperature is set to an upper limit value of a set temperature range that is set beforehand; and in a case it is determined in the determination step that the acquired value falls below the set concentration range, the set temperature is set to a lower limit value of the set temperature range.

5. The culturing method according to claim 1, wherein in the ion concentration acquisition step, the acquired value is obtained by a calculation based on a carbon dioxide concentration measurement value of the gas supplied to the culturing solution, a pH measurement value of the culturing solution, and a temperature measurement value of the culturing solution.

6. A culturing device configured to culture microalgae in a culturing solution while a gas containing carbon dioxide is supplied to the culturing solution, the culturing device comprising:
   a culturing tank configured to contain the culturing solution and the microalgae, and to which the gas from a gas supplying unit is supplied;
   an ion concentration acquisition unit configured to obtain an acquired value of a concentration of hydrogen carbonate ions in the culturing solution inside the culturing tank;
   a temperature adjustment unit configured to adjust a temperature of the culturing solution;
   a pH adjustment unit configured to adjust a pH of the culturing solution; and
   an ion concentration adjustment unit configured to compare the acquired value and a set concentration range that is set beforehand, and to, when the acquired value does not reside within the set concentration range, perform at least one of adjusting of a molar fraction of the hydrogen carbonate ions in the culturing solution by adjusting a pH of the culturing solution or adjusting of an amount of carbon dioxide dissolved in the culturing solution by adjusting a temperature of the culturing solution without adjusting a concentration of carbon dioxide in the gas, and thereby perform an adjustment of the concentration of hydrogen carbonate ions in the culturing solution inside the culturing tank.

7. The culturing device according to claim 6, wherein the pH adjustment unit adjusts the pH of the culturing solution by adding hydrochloric acid to the culturing solution.

8. The culturing device according to claim 6, further comprising:
   a carbon dioxide sensor configured to measure a carbon dioxide concentration of the gas supplied from the gas supplying unit;
   an in-tank temperature sensor configured to measure the temperature of the culturing solution inside the culturing tank; and
   an in-tank pH sensor configured to measure the pH of the culturing solution inside the culturing tank;
   wherein the ion concentration acquisition unit obtains the acquired value by a calculation based on a carbon dioxide concentration measurement value of the carbon dioxide sensor, a temperature measurement value of the in-tank temperature sensor, and a pH measurement value of the in-tank pH sensor.

9. The culturing device according to claim 6, wherein:
   a guide member extending along a vertical direction is provided in an interior of the culturing tank; and
   by the gas being supplied upwardly, the guide member draws in the culturing solution from below the guide member, and discharges the culturing solution from above the guide member, thereby generating a culturing solution flow inside the culturing tank.

* * * * *